Oct. 13, 1959    L. F. HOLLEEN    2,908,024
ADJUSTABLE DOCK RAMP
Filed Dec. 3, 1956    6 Sheets-Sheet 1

INVENTOR
LEONARD F. HOLLEEN
Caswell & Lagaard
ATTORNEYS

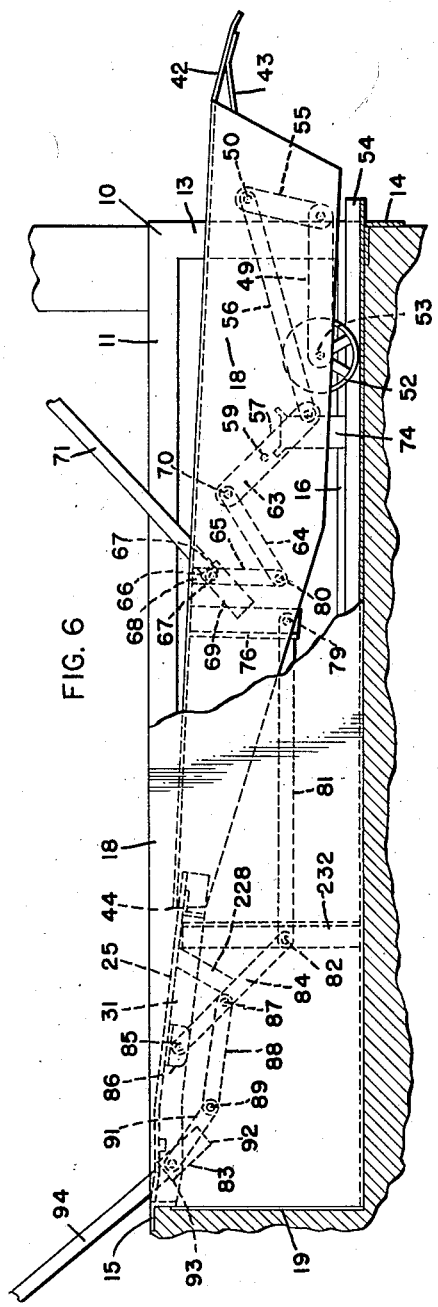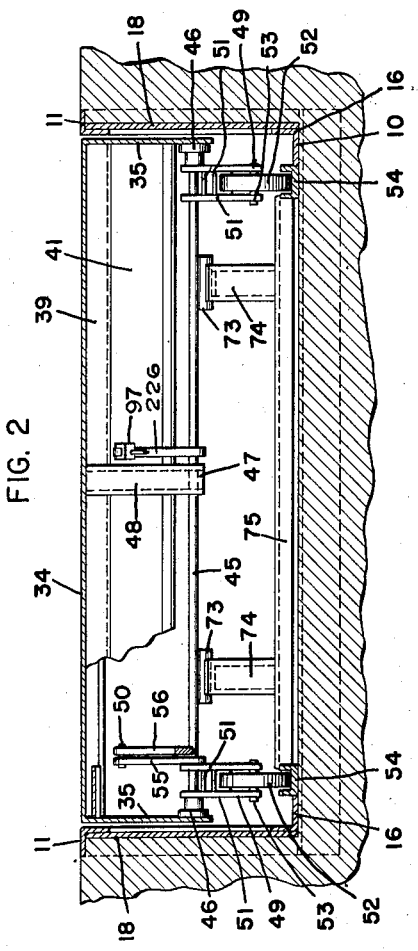

Oct. 13, 1959     L. F. HOLLEEN     2,908,024
ADJUSTABLE DOCK RAMP
Filed Dec. 3, 1956     6 Sheets-Sheet 3
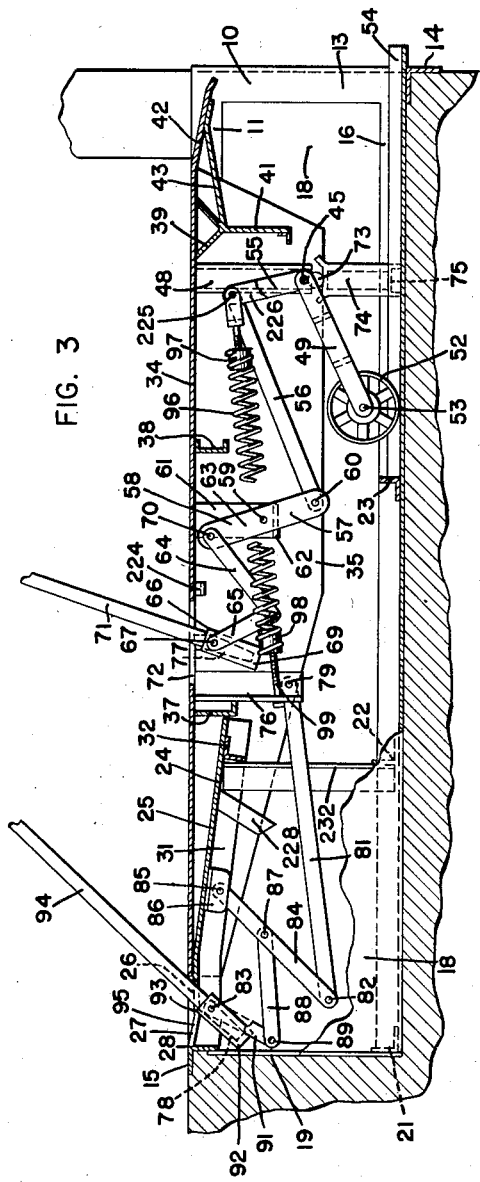
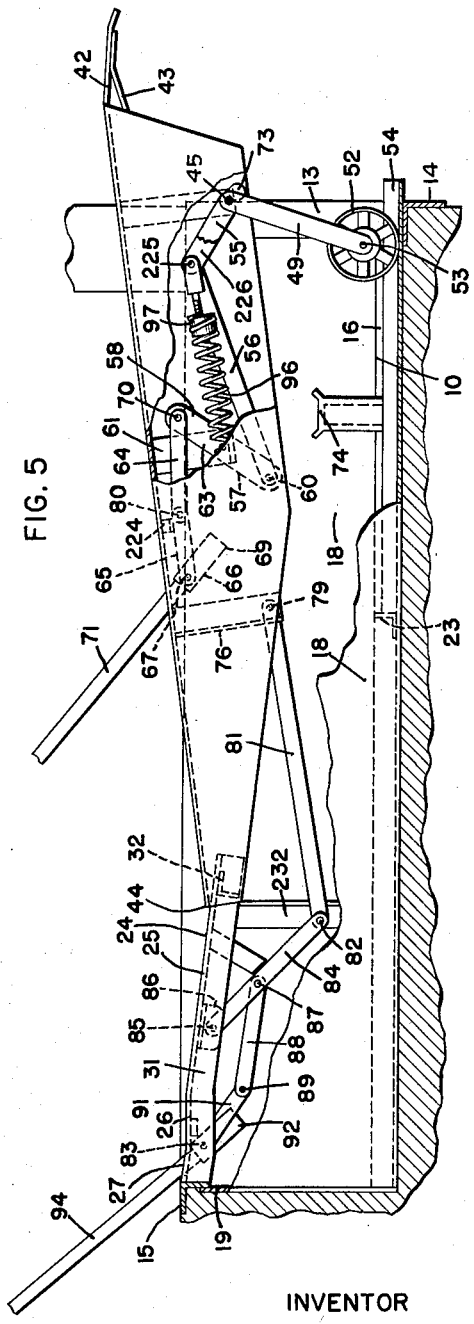
INVENTOR
LEONARD F. HOLLEEN
ATTORNEYS Oct. 13, 1959 L. F. HOLLEEN 2,908,024
ADJUSTABLE DOCK RAMP
Filed Dec. 3, 1956 6 Sheets-Sheet 4

INVENTOR
LEONARD F. HOLLEEN
Caswell & Lagaard
ATTORNEYS

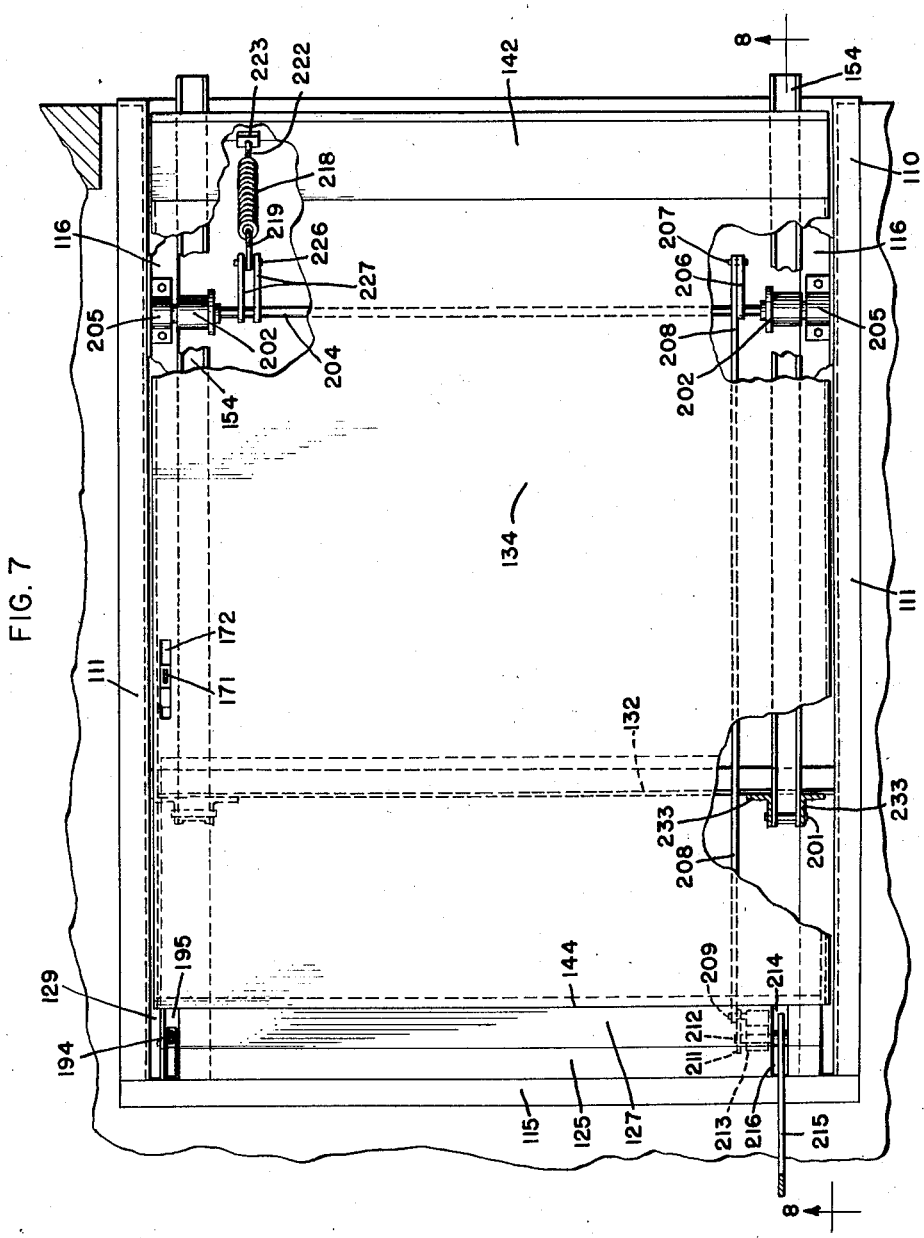

Oct. 13, 1959    L. F. HOLLEEN    2,908,024
ADJUSTABLE DOCK RAMP
Filed Dec. 3, 1956    6 Sheets-Sheet 6
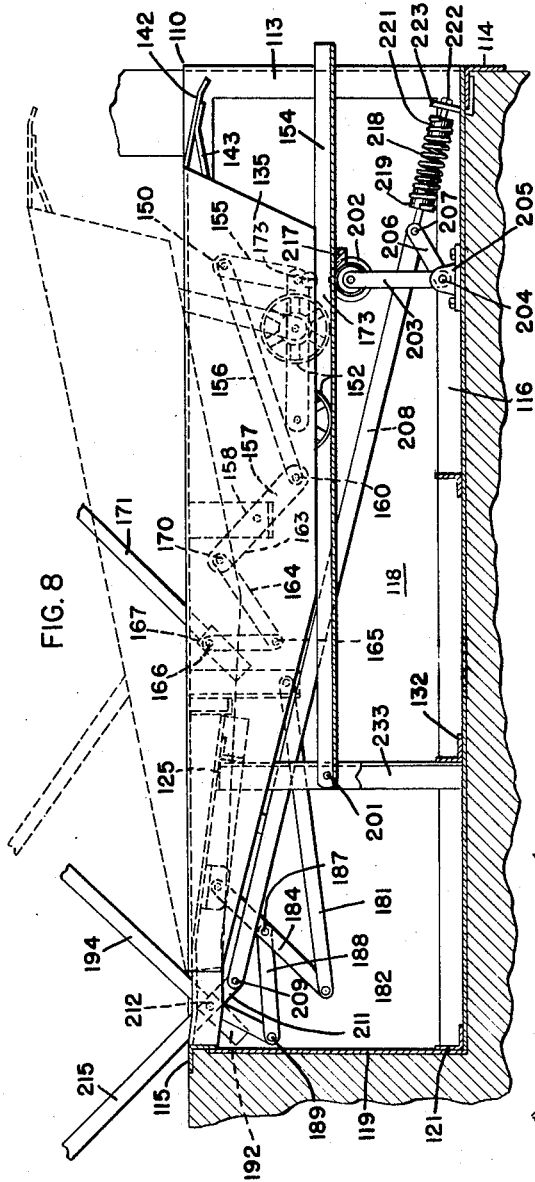
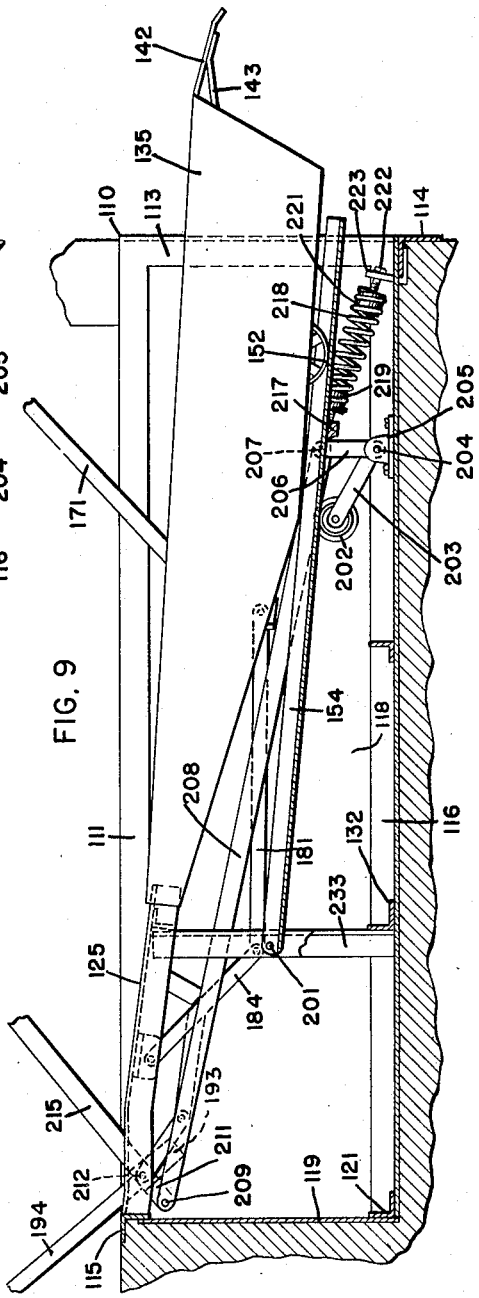
INVENTOR
LEONARD F. HOLLEEN
*Caswell & Lagaard*
ATTORNEYS

2,908,024

ADJUSTABLE DOCK RAMP

Leonard F. Holleen, Stanley, Wis.

Application December 3, 1956, Serial No. 625,952

18 Claims. (Cl. 14—71)

The herein disclosed invention relates to adjustable dock ramps and has for an object to provide a dock ramp including a deck which may be easily and quickly used to bridge the gap between the floor of a motor truck, railroad car or similar carrier to facilitate loading and unloading of the same.

An object of the invention resides in providing a dock ramp deck, the outer end of which may be raised above or dropped below the level of the dock to permit of readily loading or unloading trucks whose floors are higher than or lower than the surface of the dock.

Another object of the invention resides in providing a construction in which the deck may be moved longitudinally in a direction toward and from the dock to apply the deck to the truck at various positions of the truck with respect to the dock.

Another object of the invention resides in providing a construction which can be manually manipulated and without the use of motors or other power units.

A feature of the invention resides in providing a dock ramp which, when not in use, lies flush with the dock surface so as to permit of cross traffic with respect to the same.

An object of the invention resides in providing a tail plate at the inner end of the deck and in supporting the deck for sliding movement along said tail plate.

Another object of the invention resides in providing a track at the outer end of the dock ramp and in providing wheels carried by the deck at its outer end and guided for longitudinal movement along said track.

A still further object of the invention resides in providing means for raising and lowering the deck with reference to the wheels to elevate or depress the outer end of the deck.

Another object of the invention resides in providing means for raising and lowering the track to further increase the vertical movement of the outer end of the deck.

A feature of the invention resides in providing a construction in which the operating apparatus is confined to a relatively small space and by means of which the deck and operating parts may be readily installed at a minimum expense.

Another object of the invention resides in mounting the wheels on arms pivoted to structure associated with the deck and in providing linkage connected to said arms serving to swing said arms to raise and lower the deck.

An object of the invention resides in providing similar construction for raising and lowering the track.

A feature of the invention resides in providing linkage connected to structure associated with the deck at its inner end and serving to move the platform bodily in a longitudinal direction.

Other objects of the invention reside in the novel combination and arrangement of parts and in the details of construction hereinafter illustrated and/or described.

Fig. 2 is a cross sectional view taken substantially on line 2—2 of Fig. 1.

Fig. 3 is a longitudinal-sectional view taken substantially on line 3—3 of Fig. 1.

Fig. 5 is a view similar to Fig. 4 and showing the deck in its outermost position.

Fig. 6 is a view similar to Fig. 5 showing the deck lowered and in its outermost position.

Fig. 7 is a plan view of a modification of the invention with portions cut away to illustrate the construction thereof.

Fig. 8 is a longitudinal-sectional view taken substantially on line 8—8 of Fig. 7.

Fig. 9 is a view similar to Fig. 8 and showing the deck lowered and in its outermost position.

Figure 1:
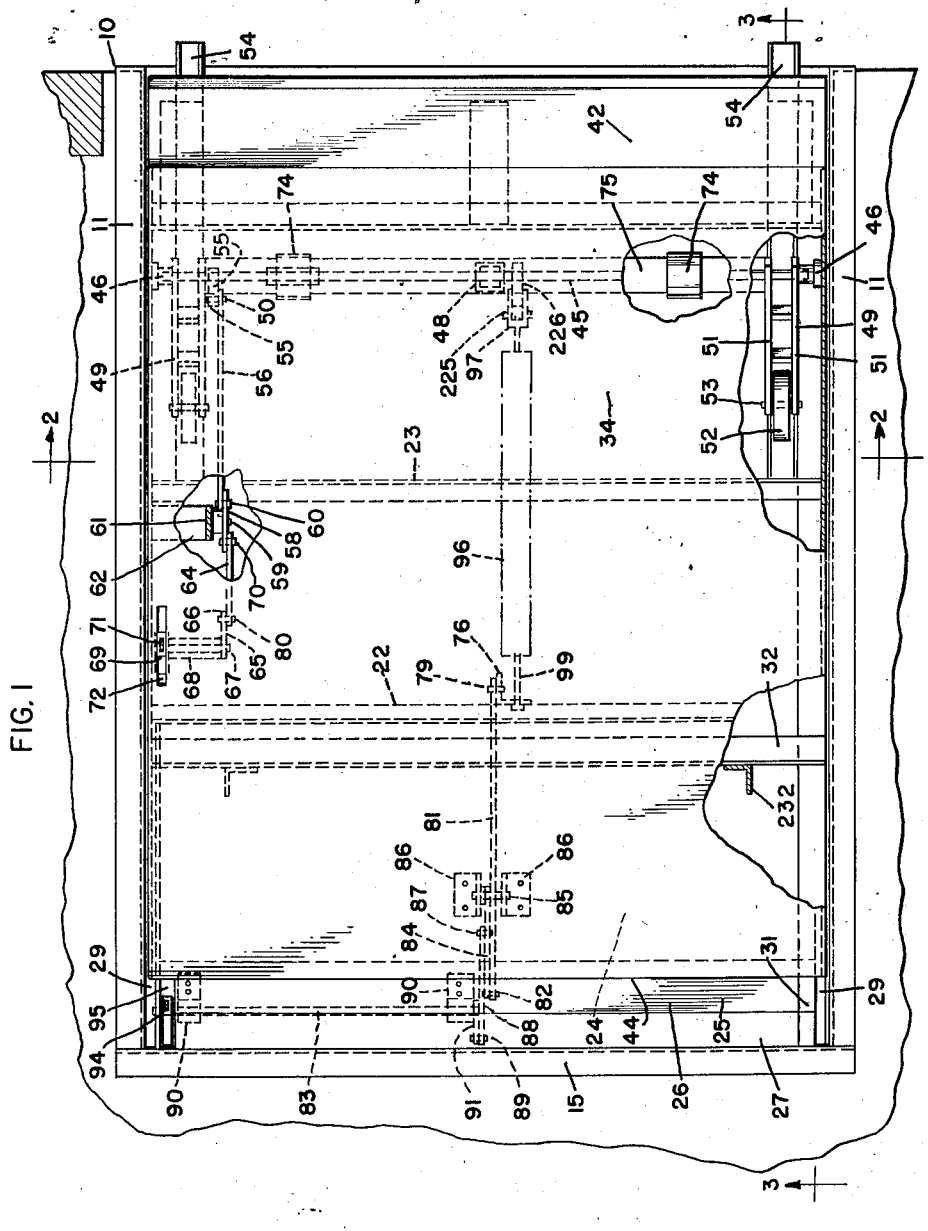
Fig. 1 is a plan view of an adjustable dock ramp with parts broken away and illustrating an embodiment of the invention.

The construction shown in Figs. 1 to 6, inclusive, comprises a frame 10 which consists of two longitudinal frame members 11. These frame members are supported on posts 13 which rest on a cross frame member 14 located at the outer end of the frame 10. The frame members 11 are connected to an inner cross frame member 15. Attached to the outer cross frame member 14 and underlying the frame members 11 are longitudinal frame members 16. Extending across the frame members 11 and 16 are two plates 18 which extend throughout the length thereof. At the rear of the frame 10 is provided another cross frame member 21 while between frame members 14 and 21 are located intermediate cross frame members 22 and 23. These frame members are attached to the frame members 16. An inner plate 19 is secured to the cross frame members 15 and 21. All of these parts are securely welded together or may be secured together in any other suitable manner.

At the inner portion of the ramp is provided a tail plate 25 which extends transversely of the frame 10 and which generally inclines downwardly as shown in Fig. 3. This tail plate has a horizontal portion 26 and a rearwardly inclined portion 27 which offsets the portion 26 from the innermost edge 28 of said tail plate. This edge is welded to the cross frame member 15 so that the same lies flush with the upper surface thereof. The remaining portion 24 of the tail plate 25 is, throughout its extent, inclined downwardly and outwardly from the horizontal portion 26 and spaced from the longitudinal frame members 11 to provide slots 29 therebetween. At the lateral portion of the tail plate 25 are provided angles 31 which are welded thereto and which extend up to and are welded to the cross frame member 15. These angles reinforce and stiffen the tail plate and project slightly above the surface of said tail plate to form rails on which the deck may slide. The forward portion of the tail plate 25 is supported on two posts 232 which are secured to the intermediate cross frame member 22 and to the angles 31. A cross frame member 32 situated adjacent these posts extends across the forward portion of the said tail plate and is secured thereto. These parts are also welded or otherwise secured together.

The ramp further comprises a deck 34 constructed of sheet iron and which has welded to the longitudinal edges thereof two deep flanges 35. These flanges have secured to them transverse frame members 37 and 38 which underlie the deck 34 and which stiffen and reinforce the same. An angle-shaped transverse frame member 39 is disposed with the edges of its flanges secured to the deck 34 at the forward portion of the same. Depending from this transverse frame member is a web 41 which is secured to said frame member and to the flanges 35.

The forward portion of the deck 34 is provided with an apron 42 which inclines with respect to said deck as shown in Fig. 3. This apron is reinforced by means of braces 43 which are secured to said apron and to the plate 41. All of these parts are secured together by welding or other suitable construction.

The innermost edge 44 of the deck 34 is supported above the tail plate 25 and slides in a longitudinal direction along the angle 31, the flanges 35 being received in the grooves 29.

The outermost portion of the deck 34 is supported by means of the following construction: Extending across the two flanges 35 is a shaft 45 which is journaled in bearings 46 attached to said flanges. This shaft is further journaled in an intermediate bearing 47 formed at the end of a hanger 48 secured to the underside of the deck 34 in close proximity to the transverse frame member 39. Secured to the shaft 45 in proximity to the bearings 46 are two depending arms 49 which consist of two spaced plates 51. Disposed between these plates are wheels 52 which are journaled on axles 53 extending through the ends of said plates. The wheels 52 ride on rails 54 which are attached to the cross frame members 14 and 23. The shaft 45 has secured to it an arm 55 which is disposed at an angle with respect to the arms 49. These various parts are also secured together by welding or otherwise.

The arm 55 has pivoted to the end of it by means of a pintle 50 a link 56 which in turn is pivoted to an arm 57 of a reversing lever 58 by means of a pintle 60. Lever 58 is pivoted by means of a pintle 59 to a hanger 61 which in turn is secured to the underside of the deck 34. A brace 62 is secured to the lower end of the hanger 61 and also to the adjoining flange 35 of the deck 34 and reinforces said hanger. The lever 58 has another arm 63 which has pivoted to it by means of a pintle 70 a link 64 which in turn is pivoted to an arm 65 of another lever 66 by means of a pintle 80. Lever 66 is pivoted by means of a pintle 67 to a bearing 68 attached to the under side of the deck 34. The lever 66 has another arm 69 which has a socket 77 and in which a handle 71 may be removably disposed. The handle 71 extends through a slot 72 in the deck 34 near one of the lateral edges thereof. By shifting the handle 71 in a back and forth direction, the levers 66 and 58 may be swung about the pintles 67 and 59 to swing the arms 49 and elevate or depress the deck 34 from the position shown in Fig. 3 to that shown in Figs. 4 and 5 and vice versa. It will be noted in Fig. 4 that when the deck is raised that the arm 65 and link 64 are positioned slightly beyond alignment. A stop 224 secured to deck 25 engages said link and terminates the movement of said parts beyond alignment. In such position of the lever 66 the deck is locked in its elevated position.

The deck 34 is held in coplanar relationship with reference to the upper surfaces of the longitudinal frame members 11 to permit of cross traffic by means of the following construction: On the shaft 45 are welded two shoes 73, which, when the wheels 52 are in engagement with the rails 54 and the deck 34 is flush with the frame members 11, are disposed on the lower sides of the shaft. These shoes are adapted to rest on two rests 74 secured to a cross frame member 75. This frame member is welded to the two rails 54 as shown in Fig. 2.

The deck 34 can be moved longitudinally while in any of its vertically adjusted positions. For the purpose, a bracket 76 is secured to the said deck and to the cross frame member 37 thereof by welding. This bracket extends downwardly below said deck and has pivoted to the lower end thereof by means of a pintle 79 a link 81. Link 81 is in turn pivoted by means of a pintle 82 to a lever 84. Lever 84 is pivoted by means of a pintle 85 to brackets 86 secured to the under side of tail plate 25. The lever 84 has pivoted to it intermediate its length by means of a pintle 87 a link 88 which in turn is pivoted by means of a pintle 89 to an arm 91 of a lever 92. Lever 92 includes an arm 93 which is formed with a socket 78 in which is removably disposed a handle 94. Lever 92 is pivoted by means of a shaft 83 which is journaled in bearings 90 attached to the under side of the tail plate 25. The handle 94 is movable in a slot 95 in said tail plate for the purpose.

In order to counterbalance the weight of the deck 34 and attached parts, a tension coil spring 96 is employed which has attached to one end of it a spring anchor 97 pivoted by means of a pintle 225 to an arm 226. This arm is secured to shaft 45. The other end of this spring has secured to it a spring anchor 98 which is tapped to receive a bolt 99. This bolt extends through the bracket 76 and upon rotation thereof serves to vary the tension on the spring and to adjust the counterbalancing effect thereof.

Link 88 and lever 84 are prevented from reaching alignment by means of a stop 228 which is secured to the tail plate 24. This stop, when the deck 34 is outermost, engages lever 84, as shown in Fig. 6, and terminates outward movement of the deck.

The dock ramp of the invention is installed in the dock by merely cutting away sufficient material of the dock to allow the assembled structure to be inserted in the cavity in the dock provided for the purpose. The frame 10 of the platform is then leveled up so that the frame members 11 and 15 lie flush with the floor of the dock and so that the posts 13 are at the edge of the building. Concrete is then poured around the sides of the frame and below the frame members 16 and the rails 54, and upon setting, the dock platform is ready for use.

Figure 4:
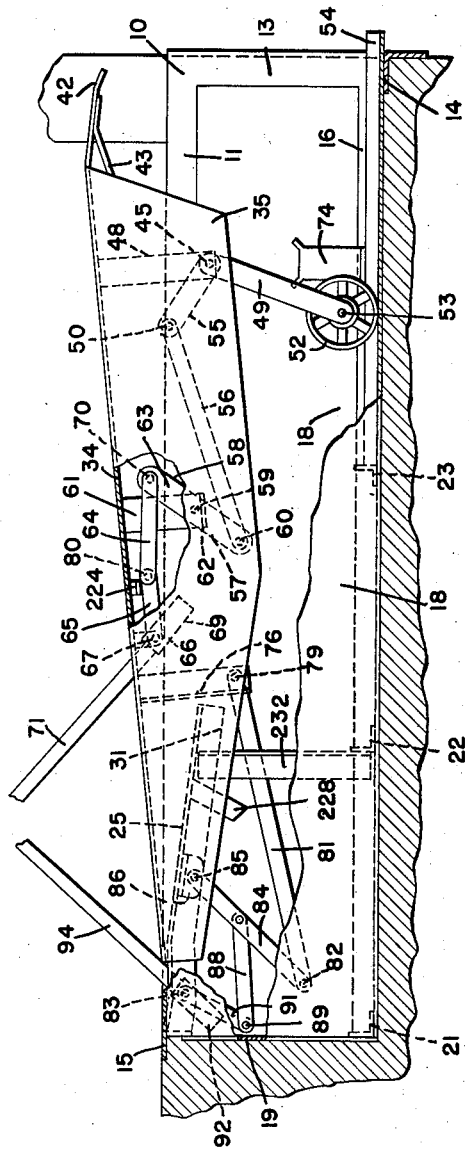
Fig. 4 is a view similar to Fig. 3 showing the deck raised.

The method of using the platform is obvious. With the deck in the position shown in Fig. 3, the truck to be loaded is backed up to the dock. The deck is then raised to maximum vertical height by pulling the handle 71 rearwardly until the arm 65 and link 64 pass alignment, as shown in Fig. 4, which automatically locks the deck in raised position. This is accomplished by the swinging of arms 49 through the linkage connected thereto and to handle 71 which raises and lowers the deck. This frees the feet 73 from the rests 74. The deck may now be moved outwardly a distance necessary to overlie the floor of the truck by pulling the handle 94 rearwardly and which, through the linkage connected therewith, causes the wheels 52 to roll along the rails 54 and the rear edge 44 of the deck to slide along the upper surfaces of angles 31 of the tail plate 25. When the apron 42 is well over the rearward portion of the floor of the truck, handle 71 is moved forwardly to lower the apron into engagement with the same. The platform is now ready for use and will float up and down in accordance with up and down movement of the truck floor. In bringing the deck back to normal position, the deck is raised again to full vertical height as previously described. The handle 94 is then moved forwardly which moves the deck in a rearward direction and brings the feet 73 above the rests 74 when the deck is in its fully retracted position. The deck can now be lowered through handle 71, and when the feet 73 come to rest upon the rests 74, the deck is back to normal position. In such position, the deck is level with the surface of the dock, and traffic may cross the same if desired.

The form of the invention shown in Figs. 7, 8 and 9 is similar to that shown in Figs. 1 to 6. For this reason the corresponding parts will not be again described and the same reference numerals preceded by the digit "1" will be used to designate the corresponding parts. In this form of the invention, the posts 113, the side plates 118, and the rear plate 119 are made considerably deeper. In this case, the rails 154 are pivoted to posts 233 by means of pintles 201. These posts are disposed one on each side of said rails and are attached to cross frame members 132 and tail plate 125. The rails 154 rest on flanged rollers 202 which are rotatably mounted on swinging arms 203. Arms 203 are welded to a shaft 204 which is journaled for swinging movement in bearings 205 secured to the frame members 116. The shaft 204 has welded to it an arm 206 which has pivoted to it by means of a pintle 207 a link 208. The link 208 is in turn pivoted by means of a pintle 209 to an arm 211. This arm is welded to a shaft 212 best shown in Fig. 7. Shaft 212 is journaled in a bearing 213 secured to the under side of the tail plate 125. This shaft 212 has welded to it an arm 214 similar to arm 69 and which in like manner removably receives a handle 215. Arm 214 is also similar to the arm 193. Handle 215 operates through a slot 216 in the tail plate 125. The movement of the rollers 202, when the arms 206 pass vertical, is terminated by means of stops 217 welded to the under sides of the rails 154. When in engagement therewith, the rails are locked in normal position. The weight of the deck and attached parts is partially counterbalanced by means of a tension coil spring 218 provided with a spring anchor 219 at one end thereof. This spring anchor is pivoted on a pintle 26 carried by arms 227 welded to shaft 204. The other end of said spring is attached to a spring anchor 221 which is tapped to receive a bolt 222. This bolt passes through a bracket 223 secured to the cross frame member 114. The spring 218 also aids in holding the rollers 202 against the stops 217.

The mode of operation of the construction shown in Figs. 6, 7 and 8 is similar to that described for the other form of the invention. In addition to the movement in an up and down direction through handle 194, additional vertical movement may be secured by handle 215 so as to increase the vertical movement of the apron 142 of the deck. With this construction, the rests 74 may be dispensed with as feet 173 now rest on rails 154 which are supported by the arms 203 and the rollers 202. With this construction, the platform may be brought to normal position in which the deck is flush with the dock surface from any vertically adjusted position of the deck or the apron and provides for cross traffic.

The advantages of the invention are manifest. A simple and far less expensive construction is provided than that heretofore in use. In addition, the dock may be raised, lowered and moved toward and from the truck manually and without undue effort, thereby avoiding the necessity of electrically operated apparatus. The deck can be raised and lowered and moved longitudinally independently of each other to quickly and easily position the deck apron on the floor of the truck. By inclining the tail plate, the deck can be both lowered and elevated above the normal surface of the dock.

Changes in the specific form of the invention, as herein described, may be made within the scope of what is claimed without departing from the spirit of the invention.

Having described the invention, what is claimed as new and desired to be protected by letters patent is:

1. In an adjustable dock ramp a frame, a deck supported by said frame, guide means on said frame and supporting and guiding the inner end of said deck for back and forth movement relative to said frame, a track below the outer portion of the deck and fixed relative to said frame, wheels engaging and movable along said track below the outer portion of said deck, means depending from the outer portion of the deck and extending below the same, bearings secured to said last named means, a shaft rotatably mounted in said bearings, arms secured to said shaft, journals at the outer ends of said arms rotatably supporting said wheels, another arm attached to said shaft, a lever arm pivoted to said deck a handle operatively connected to said lever arms, a second lever pivoted to said frame and having two arms extending in opposite directions, a link connecting said lever arm with one of the arms of said reversing lever and another link connecting the other arm of said reversing lever with the last named arm attached to said shaft, said first named link and said lever arm being adapted to move into substantial alignment when the wheels are lowermost to lock said shaft from movement and hold the outer end of the deck in elevated position.

2. In an adjustable dock ramp a frame, a deck supported by said frame, guide means on said frame and supporting and guiding the inner end of said deck for back and forth movement relative to said frame, a track below the outer portion of the deck and fixed relative to said frame, wheels engaging and movable along said track below the outer portion of said deck, means depending from the outer portion of the deck and extending below the same, bearings secured to said last named means, a shaft rotatably mounted in said bearings, a plurality of arms secured to said shaft, journals at the outer ends of two of said arms and rotatably supporting said wheels, another of said arms connected to said shaft being movable in a direction toward and from the inner portion of the deck, a lever pivoted to said deck and having two arms, a handle attached to one of said last named arms, a second lever pivoted to said deck and having two arms, a link connecting the other arm of said first named lever with one of the arms of said second named lever and another link connecting the other arm of said second named lever with one of the arms attached to said shaft, a spring anchor attached to said deck below the same and inwardly of said shaft, and a tension coil spring connected to one of the arms secured to the shaft and to said spring anchor and urging the outer end of said deck upwardly.

3. In an adjustable dock ramp a frame, a deck supported by said frame, guide means on said frame and supporting and guiding said deck for sliding movement along said frame, a first lever pivoted to said frame and situated at the inner end thereof, said lever having a depending arm and an upwardly extending handle extending above said deck, a second lever pivoted at one end to a part fixed relative to said frame and depending therefrom, a link pivoted to the lower end of said second lever and to a part fixed relative to said deck and a second link pivoted to the lower end of the depending arm of said first lever and to said second lever at a locality intermediate the ends thereof.

4. In an adjustable dock ramp a frame, a deck supported by said frame, guide means on said supporting frame and supporting said deck for up and down swinging movement about its inner edge as an axis, a longitudinally extending track below the outer portion of the deck and fixed relative to said frame, wheels engaging and movable along said track below the outer portion of said deck, means depending from the outer portion of the deck and extending below the same, bearings secured to said last named means, a transverse shaft rotatably mounted in said bearings, two arms secured to said shaft and extending in the same direction, journals at the outer ends of two of said arms rotatably supporting said wheels, another arm attached to said shaft, a lever arm pivoted to said deck, a handle operatively connected to said lever arm, a reversing lever pivoted to said deck and having two arms, a link connecting the lever arm with one of the arms of said reversing lever and another link connecting the other arm of said reversing lever with the last named arm attached to said shaft.

5. In an adjustable dock ramp an elongated frame, a tail plate carried by said frame at the upper inner end thereof and having a portion at its innermost end flush with the surface of the dock, a deck having its innermost edge overlying, resting upon and slidable along the upper surface of said tail plate and in a longitudinal direction relative to said frame, said tail plate having an inclined portion adjacent the first named portion, said tail plate having another inclined portion extending outwardly of the first named inclined portion to accommodate movement of the deck to various longitudinally adjusted positions and means acting between the deck and frame for raising and lowering the outermost portion of the deck from a normal position to various vertically adjusted positions and to a lowered position in which the deck lies substantially in continuity with the inclined portion of the tail plate, and means acting between said deck and frame and moving said deck in a back and forth direction.

6. In an adjustable dock ramp a frame, a deck supported by said frame, guide means on said frame and supporting and guiding the inner end of said deck for back and forth movement relative to said frame, longitudinally extending supporting means below said deck near the outer end thereof and fixed relative to said frame, means depending from the outer portion of the deck and extending below the same, bearings secured to said last named means, a transverse shaft rotatably mounted in said bearings, arms secured to said shaft, engaging means carried by the ends of said arms and engaging said supporting means for movement thereon, an additional arm attached to said shaft, a coil spring disposed beneath and extending along said deck, means fixed relative to the inner end of said deck and engaging one end of said coil spring, means connected to said last named arm and engaging the other end of said coil spring, said coil spring operating to counterbalance said deck and means for moving said shaft to raise and lower the deck.

7. In an adjustable dock ramp a frame, a deck supported by said frame, guide means on said frame and supporting and guiding the inner end of said deck for back and forth movement relative to said frame, longitudinally extending supporting means below said deck near the outer end thereof and fixed relative to said frame, means depending from the outer portion of the deck and extending below the same, bearings secured to said last named means, a shaft rotatably mounted in said bearings, arms secured to said shaft, engaging means carried by the ends of said arms and engaging said supporting means for movement thereon, a tension coil spring disposed beneath and extending along said deck, means fixed relative to the inner end of said deck, said coil spring being connected at one end to said means and another arm extending upwardly from and fixed relative to said shaft, said coil spring being connected at its other end to said last named arm.

8. In an adjustable dock ramp an elongated frame, a tail plate carried by said frame at the upper portion of the inner end thereof, a deck having its innermost edge superimposing and supported by said tail plate, said deck being slidable along the upper surface of the tail plate and in a longitudinal direction relative to said frame, a longitudinally extending track below the outer portion of said deck and fixed relative to said frame, wheels engaging and movable along said track, adjusting means acting between said wheels and deck and including arms pivoted relative to said deck and supporting said wheels for rotation, said arms being movable in a direction to cause the deck to move toward and from the wheels and linkage means connected to said arms and reacting against a part fixed relative to said deck and serving to swing the same to raise and lower the outer portion of the deck, and means acting between said deck and frame and moving said deck in a back and forth direction.

9. In an adjustable dock ramp a frame, a deck supported by said frame, guide means on said frame and supporting and guiding the inner end of said deck for sliding movement along said frame, a track below the outer portion of the deck, wheels engaging and movable along said track below the outer portion of said deck and adjusting means carried by said deck and operatively connected to said wheels and deck for moving the deck in an up and down direction toward and from the wheels, and means acting between said deck and frame and moving said deck in a back and forth direction.

10. In an adjustable dock ramp, a frame, a deck supported by said frame, guide means on said frame and supporting and guiding the inner end of said deck for sliding movement along said frame, a substantially horizontal track below the outer portion of the deck, wheels engaging and movable along said track, arms pivoted to said deck and extending below the same, means at the outer ends of said arms for journaling said wheels for rotation, linkage means connected to said arms and serving to swing the same to raise and lower the outer portion of the deck, and means acting between said deck and frame and moving said deck in a back and forth direction.

11. In an adjustable dock ramp a frame, a deck supported by said frame, guide means on said frame and supporting and guiding the inner end of said deck for back and forth movement relative to said frame, a substantially horizontal track below the outer portion of the deck, wheels engaging and movable along said track, means attached to and depending from the outer portion of the deck and extending below the same, bearings secured to said means, a shaft rotatably mounted in said bearings, arms secured to said shaft, journals at the outer end of said arms rotatably supporting said wheels, an arm attached to said shaft and linkage means connected to said last named arm and serving to rotate said shaft and to raise and lower the outer portion of the deck.

12. In an adjustable dock ramp a frame, a deck supported by said frame, guide means on said frame and supporting and guiding the outer end of said deck for up and down swinging movement relative to said frame, a substantially horizontal track below the outer portion of the deck, wheels engaging and movable along said track below the outer portion of said deck, means depending from the outer portion of the deck and extending below the same, bearings secured to said last named means, a transverse shaft rotatably mounted in said bearings, two longitudinally extending arms secured to said shaft, journals at the outer end of said arms rotatably supporting said wheels, an arm attached to said shaft, linkage means connected to said last named arm and serving to rotate said shaft and to raise and lower the outer portion of the deck and rests carried by said frame and engageable with said shaft to support the deck in normal position.

13. In an adjustable dock ramp a frame, a deck supported by said frame, guide means on said frame and supporting and guiding the outer end of said deck for up and down swinging movement relative to said frame, a track below the outer portion of the deck and supported by said frame, wheels engaging and movable along said track below the outer portion of said deck, means depending from the outer portion of the deck and extending below the same, bearings secured to said last named means, a shaft rotatably mounted in said bearings, two longitudinally extending arms secured to said shaft, journals at the outer end of said arms rotatably supporting said wheels, an arm attached to said shaft, linkage means connected to said last named arm and serving to rotate said shaft and to raise and lower the outer portion of the deck and resilient means acting between a part fixed to and eccentric with reference to said shaft and said deck and counterbalancing the weight of said deck when the same is raised.

14. In an adjustable dock ramp a frame, a deck supported by said frame, guide means on said frame and supporting and guiding the inner end of said deck for sliding movement along said frame, a track below the outer portion of the deck, wheels engaging and movable along said track, arms pivoted to said deck and extending below the same, means at the outer ends of said arms for journaling said wheels for rotation, linkage means connected to said arms and serving to swing the same to raise and lower the outer portion of the deck, and separate linkage means acting between said frame and deck and sliding said deck along said frame.

15. In an adjustable dock ramp a frame, a deck supported by said frame, guide means on said frame and supporting and guiding the inner end of said deck for sliding movement along said frame, a track below the outer portion of the deck, wheels engaging and movable along said track, arms pivoted to said deck and extending below the same, means at the outer ends of said arms for journaling said wheels for rotation, linkage connected to said arms and serving to swing the same to raise and lower the outer portion of the deck, means operatively connected to the inner end of said track and to said frame for pivoting said track for swinging movement in an up and down direction, manually controlled linkage means carried by said frame and operatively connected to said track for raising and lowering the outer end of said track, and means on said frame and operatively connected to said deck and moving said deck in a back and forth direction.

16. In an adjustable dock ramp a frame, a deck supported by said frame, guide means on said frame and supporting and guiding the inner end of said deck for sliding movement along said frame, a track below the outer portion of the deck, wheels engaging and movable along said track, arms pivoted to said deck and extending below the same, means at the outer ends of said arms for journaling said wheels for rotation, linkage means connected to said arms and deck and serving to swing the same to raise and lower the forward portion of the deck, means operatively connected to the inner end of the track and to said frame for pivoting said track for swinging movement in an up and down direction and having an axis fixed relative to said frame, manually controlled linkage means acting between said track and frame for raising and lowering the outer end of said track, resilient means acting between said track and frame and serving to counterbalance said track and deck, and means acting between said deck and frame and moving said deck in a back and forth direction.

17. In an adjustable dock ramp a frame, a deck supported by said frame, guide means on said frame and supporting and guiding the inner end of said deck for sliding movement along said frame, a track below the outer portion of the deck and supported by said frame, wheels engaging and movable along said track, arms pivoted to said deck and extending below the same, means at the outer ends of said arms for journaling said wheels for rotation, linkage means connected to said arms and deck and serving to swing the same to raise and lower the outer portion of the deck, means for pivoting said track relative to said frame for up and down swinging movement, arms pivoted to said frame and extending upwardly therefrom, rollers pivotally mounted on said arms and engaging said track from beneath, linkage means connected to said last named arms and serving to swing said arms to raise and lower said track, and means acting between said deck and frame and moving said deck in a back and forth direction.

18. In an adjustable dock ramp a frame, a deck supported by said frame, guide means on said frame and supporting and guiding the inner end of said deck for sliding movement along said frame, a track below the outer portion of the deck and mounted on said frame, means acting between said deck and track and guiding the outer portion of the deck for up and down movement relative to said track, means acting between said track and frame and guiding said track for further movement in an up and down direction, manually controlled linkage means acting between said track and frame and procuring said movement, and means acting between said deck and frame and moving said deck in a back and forth direction.

References Cited in the file of this patent

UNITED STATES PATENTS

| | | |
|---|---|---|
| 2,188,554 | Marrianno | Jan. 30, 1940 |
| 2,639,450 | Ramer | May 26, 1953 |
| 2,689,965 | Fenton | Sept. 28, 1954 |

UNITED STATES PATENT OFFICE

CERTIFICATE OF CORRECTION

October 13, 1959

Patent No. 2,908,024

Leonard F. Holleen

It is hereby certified that error appears in the printed specification of the above numbered patent requiring correction and that the said Letters Patent should read as corrected below.

Column 5, line 69, for "a second lever" read -- a reversing lever --.

Signed and sealed this 3rd day of May 1960.

(SEAL)
Attest:

KARL H. AXLINE
Attesting Officer

ROBERT C. WATSON
Commissioner of Patents